(12) United States Patent
Michaud

(10) Patent No.: US 6,596,060 B1
(45) Date of Patent: Jul. 22, 2003

(54) WATER-REPELLENT COMPOSITION

(75) Inventor: Pascal Michaud, Saint-Gratien (FR)

(73) Assignee: Atofina, Paris (FR)

( * ) Notice: Subject to any disclaimer, the term of this patent is extended or adjusted under 35 U.S.C. 154(b) by 0 days.

(21) Appl. No.: 09/763,061

(22) PCT Filed: Aug. 6, 1999

(86) PCT No.: PCT/FR99/01949

§ 371 (c)(1),
(2), (4) Date: Apr. 6, 2001

(87) PCT Pub. No.: WO00/11101

PCT Pub. Date: Mar. 2, 2000

(30) Foreign Application Priority Data

Aug. 19, 1998 (FR) .............................. 98 10555

(51) Int. Cl.⁷ ................................. C09K 3/18
(52) U.S. Cl. ................. 106/2; 106/287.14; 427/387
(58) Field of Search ............... 106/2, 287.14; 427/387

(56) References Cited

U.S. PATENT DOCUMENTS

| | | | |
|---|---|---|---|
| 3,639,131 A | 2/1972 | Clarke ............................ | 106/2 |
| 4,670,500 A | 6/1987 | Gupta ........................ | 524/447 |
| 5,470,504 A | 11/1995 | Kiehn et al. ................ | 252/49.6 |

FOREIGN PATENT DOCUMENTS

| | | |
|---|---|---|
| EP | 0 545 872 | 6/1993 |
| EP | 0 851 016 | 7/1998 |
| GB | 1 199 501 | 7/1970 |
| JP | 6240237 | 8/1994 |

*Primary Examiner*—Anthony J. Green
(74) *Attorney, Agent, or Firm*—Millen White Zelano & Branigan

(57) ABSTRACT

The present invention relates to a water-repellant composition consisting essentially of at least one hydrophobic agent and at least one solvent which is compatible with the at least one hydrophobic active agent, this solvent being other than a fluorinated hydrocarbon, wherein the solvent is organic compound comprising at least one oxygen-comprising functional group and in that the hydrophobic active agent is a compound of an organopolysiloxane of formula (I):

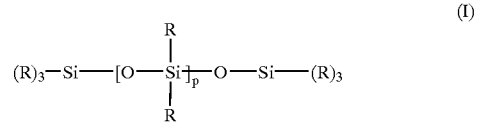

(I)

where P is an integer ranging from 0 to 150 and each R independently represents an alkyl or alkoxy group with 1 to 10 carbon atoms, a cycloalkyl group with 3 to 10 carbon atoms, a phenyl group, an aminated group, a halogen or a hydrogen, with the condition that at least one R is an aminated group.

17 Claims, No Drawings

WATER-REPELLENT COMPOSITION

The invention relates to a water-repellent composition, referred to as an anti-wetting composition, a rain-repellent composition, which makes it possible to prevent the deposition of liquid, in particular of water or an aqueous liquid, on a surface; it relates in particular to a composition for preventing the deposition of water or for driving off rainwater or any other water sprayed onto a preferably transparent surface, in particular a glass surface, for example the surface of a window and in particular the surface of a windshield of a motor vehicle or alternatively of an aircraft.

Several solutions have been provided for removing or repelling liquids and in particular rain or other fluids sprayed onto windows and other transparent surfaces, such as the windshields of motor vehicles or boats, in order in particular to maintain clear vision through these windshields, which clear vision is essential in ensuring the comfort and the safety of travellers. Indeed, the problem of visibility in heavy rain is one of the oldest problems encountered, in particular in the automobile section.

The solutions envisaged can be put into two main categories:
  mechanical means,
  chemical means.

In the first category, windshield wipers have been and are employed with success on windshields, but also on other glass surfaces, such as headlamp lenses or automobile, boat or locomotive windows.

However, to be efficient, windshield wipers require high sweeping rates and consequently result in a high consumption of electricity in employing the associated devices. They also tire out the driver of said vehicle.

The second category of solutions envisaged is that of chemical means, it being possible for these means to be used alone or in addition to the mechanical means described above. These means generally consist in rendering the surface hydrophobic, that is to say non-wettable by water. In other words, on the treated surface, for example the external surface of the windshield rendered non-wettable because of the hydrophobic coating which it carries, the water is instantly converted into minuscule droplets which are entrained by the high-speed airstream which sweeps the windshield. Excellent visibility can thus be obtained, a visibility superior to that of the mechanical processes employed alone.

Numerous documents exist relating to the application of coatings to surfaces, in particular transparent surfaces, in order to render them water-repellent or non-wettable.

U.S. Pat. No. 2,612,458 and U.S. Pat. No. 2,777,772 disclose water-repellent products composed of substitution polysilanes applied by rubbing with a frictional agent on a clean and dry-windshield.

U.S. Pat. No. 2,923,633 relates to water-repellent or rain-repellent products for windshields, in particular for the windshields of vehicles which are moving at high speed, which comprise polysilanes comprising alkoxy groups. These products are mixed with carbon black or rouge, which acts as frictional agent, in order to form a paste which is applied by rubbing on the clean and dry windshield. The application of an additional wax layer is not necessary.

U.S. Pat. No. 2,962,390 relates to a water-repellent composition in which first of all a paste of alkylalkoxysilane with, for example, carbon black is applied to a surface to be treated, which paste is hydrolyzed and then covered with a layer of water-repellent paraffin wax and a polyamide resin. The treated surface must be clean and dry.

These compositions exhibit the significant disadvantage of requiring application operations which are often lengthy and complicated. Numerous water-repellent compositions also require a curing stage, in particular a heat-curing stage, in order to be able to be operational; for this reason, their use, despite the excellent protection obtained, is extremely restricting.

For this reason, other water-repellent compositions comprise alkylpolysiloxanes and strong acids in a solvent and are disclosed in particular in U.S. Pat. No. 3,579,540; these compositions form a long-lasting highly resistant film but also exhibit the essential disadvantage of being corrosive, in particular for metal components.

Patent Application JP 07 041 336 discloses a rain-repellent composition for automobile windows which comprises a modified aminopolysiloxane, an alcohol, water and formic acid.

U.S. Pat. No. 5,021,089 discloses noncorrosive water-repellent compositions which are devoid of strong acid and which comprise a silyl phosphate, an organopolysiloxane (dimethylpolysiloxane) and a volatile organic solvent which can be an organopolysiloxane (oligomer). These compositions are applied to clean and dry glass surfaces in order to form a uniform film and cannot be applied when it is raining.

Likewise, Patent Application FR-A-2 662 171 relates to a noncorrosive water-repellent composition for nonporous materials comprising an alkylpolysiloxane, for example a dimethylpolysiloxane, and sodium silicate. In order to apply, it is necessary first to clean and dry the surface to be treated, to allow the coating to dry and to polish.

All the compositions mentioned above are compositions which have to be applied according to a restricting procedure. In addition, the coating applied only has a limited lifetime and disappears as a result of erosion by rain, hail, snow, ice crystals, dust and sand.

The active products applied have to satisfy a large number of requirements, listed for example in U.S. Pat. No. 3,433,750, such as in particular:
  they must exhibit a favorable refractive index,
  they must be nonaggressive with respect to the materials of the surfaces to which they are applied, in particular with respect to the organic and metallic materials employed in automobiles,
  they must be nontoxic.

The products of the prior art which are currently the most commonly used, while they are satisfactory as regards the majority of the preceding requirements, exhibit, however, the disadvantage of leaving deposits on the surfaces, such as the windows, during drying which are difficult to remove. These deposits are a relatively minor nuisance with respect to the visibility but aesthetically harmful with respect to the external appearance of the automobile. These disadvantages are intensified by the successive spraying and deposition of several layers of products, thus resulting in an increasing lack of visibility. In addition, these sprayable compositions comprise, as carrier solvent or fluid, compounds of CFC or chlorofluorocarbon type belonging to the family of the Freons®, F 113 (1,1,2-trichloro-1,2,2-trifluoroethane), which are responsible for the destruction of the stratospheric ozone layer and the use of which is subject to increasingly strict regulations which have resulted, according to the Montreal Protocol, in a complete ban on them from January 1, 1996.

The replacement of compounds of CFC type by compounds of HCFC type, such as F141b, has been envisaged but increasingly strict regulations targeted at banning in the more or less long term the use of such compounds have been or will be promulgated in many countries.

It is thus imperative to employ other carrier solvents or fluids which do not exhibit such a negative influence on the ozone layer. However, the search for such compounds, when they have to be employed as specific solvents for water-repellent products, encounters a great many difficulties as these solvent compounds have to satisfy a great many criteria which are difficult to harmonize from the viewpoint in particular of their toxicity (an important factor, in particular in the case of a leak), stability, density or vapor pressure and of their compatibility with the water-repellent active products and with the propellant gas and optionally with the other compounds which can be included in the composition and optionally the materials encountered during its application.

A subject matter of the invention is thus a water-repellent, also known as rain-repellent, composition which is not polymerized on contact with the air, does not leave hardened deposits and marks on the treated surfaces and has excellent water-repellent effectiveness in heavy rain and which also fulfils all the conditions mentioned above for such compositions and in particular complete solubilization and stability of the active compound over a wide temperature range, for example from −55° C. up to 80° C.

Another object of the invention is to provide a water-repellent composition which can be sprayed in the form of an aerosol and which can comprise a carrier fluid or a solvent which fulfils, inter alia, the abovementioned conditions, in conformity with the regulations banning compounds which are harmful to the ozone layer, and which is compatible with the active product, that is to say which in particular dissolves the latter over the entire temperature range, and the repellent gas, this composition being packaged in a container pressurized with an inert gas.

These objectives and also others are achieved according to the present invention by a water-repellent composition, also known as a rain-repellent composition, composed of at least one hydrophobic active agent and of at least one solvent which is compatible with the hydrophobic active agent, this solvent being other than a fluorinated hydrocarbon, characterized in that the solvent is an organic compound comprising at least one oxygen-comprising functional group and in that the hydrophobic active agent is a compound of organopolysiloxane type.

According to the present invention, the organic compound comprising at least one oxygen-comprising functional group is chosen from alcohol, ketone, ether, ester and acetal functional groups.

Mention may be made, by way of illustration of such compounds, of alcohols, such as methanol, ethanol, isopropanol, propanol, butanols or fluorinated alcohols having a number of carbon atoms ranging from 2 to 12; ketones, such as acetone, methyl ethyl ketone, methyl isobutyl ketone or methyl isoamyl ketone; ethers, such as THF, methyl tert-butyl ether, tert-butyl ether or diethyl ether; acetals, such as diethoxyethane; or ether alcohols and their derivatives, such as methoxypropanol, 1-ethoxy-2-propanol, 1-propoxy-2-propanol, 1-n-butoxy-2-propanol, 1-n-butoxy-2-propanol, [lacuna]-tert-butoxy-2-propanol, 2-methoxyethanol, 2-ethoxyethanol, propylene glycol methyl ether acetate, propylene glycol ethyl ether acetate or ethylene glycol methyl ether acetate.

The organic compound according to the present invention, chosen from the abovementioned compounds and in particular isopropanol, can be present alone or as a mixture with one or more compound(s) chosen from the abovementioned-compounds or alternatively as a mixture with a dearomatized petroleum fraction centered on $C_8$.

The composition according to the invention preferably comprises from 80% to 99% by mass, preferably from 85 to 99% and better still from 90 to 98% of solvent and from 1 to 20%, preferably from 1 to 15% and better still from 2 to 10% of hydrophobic active agent.

The hydrophobic active agent of organopolysiloxane type, also known as silicone fluid, employed in the composition according to the invention is preferably chosen from the compounds of general formula (I)

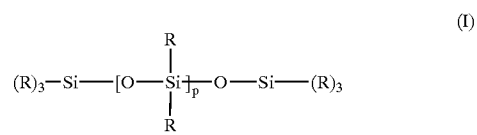

where p is an integer from 0 to 150 and the R symbols, which are identical or different, each represent an alkyl or alkoxy group with 1 to 10 carbon atoms, a cycloalkyl group with 3 to 10 carbon atoms, a phenyl group, an aminated group, a halogen (F, Cl, Br or I) or a hydrogen.

The hydrophobic active agent of organopolysiloxane type is chosen from compounds of silicone fluid or oil type comprising a reactive amino functional group, that is to say that, in the formula (I), at least one of the R groups is an aminated group, that is to say, for example, a group such as one of those already defined above carrying an amino group.

Such compounds are available, for example, from General Electric under the name SF 1706.

The composition can optionally also comprise a perfume essence in order to communicate a pleasant smell to the aerosol; this perfume essence will preferably be an essence with an orange or lemon smell, for example d-limonene, Gallia green or vanillin; the perfume essence, when it is present, represents from 0.001 to 1% by mass, preferably 0.01 to 0.1%, of the composition.

Other compounds and adjuvants can be included in the composition in order to improve one or other property thereof, for example stabilizers, such as nitroalkanes, for example nitromethane or nitroethane, and acetals, for example methylal or 1,3-dioxolane, or corrosion inhibitors, in proportions of 0.1 to 5% (preferably approximately 0.5%) with respect to the weight of the composition.

The composition according to the invention as all the properties usually required for a water-repellent liquid, also known as an anti-wetting or rain-repellent liquid: favorable refractive index, nonaggressiveness with respect to the materials used in the manufacture of the vehicles on which it is liable to be employed, low toxicity (of all its components) toward people and good stability on storage, in particular in pressurized containers, over a wide temperature range, for example from −55° C. up to 80° C.

In addition, the composition according to the invention can be applied when windshield wipers or other mechanical means are or are not used.

Finally, in contrast to the compositions of the prior art, for which the successive deliveries of product increase the lack of visibility, the composition according to the invention exhibits the advantage of making possible the deposition of several successive layers of the product without harming its effectiveness and while making it possible to easily clean the surface receiving said product.

Preferably, according to the invention, the composition is packaged in a disposable pressurized container pressurized with an appropriate gas; mention will be made, among gases which can be used, of dimethyl ether, nitrogen, argon or F 134a (1,1,1,2-tetrafluoroethane). Nitrogen will preferably be used.

The composition can also be added to the product present in the windshield washer of automobiles.

The composition according to the invention is applied in the removal of water from any surface, in particular transparent surface, for which the presence of water is undesirable; it can in particular be a glass surface or a window forming part of a vehicle or of a boat and in particular the windshield of a motor vehicle; it can also be the glass surface of headlamps, of a camera lens, of a device for the laser or non-laser guiding of a guided missile, and the like, or any other glass surface or else a visor of an automobile or motorcycle crash helmet or of any other device. The water can have any origin; it can be rainwater or other water, or water laden with various minerals, for example seawater, with respect to which the composition of the invention is also effective; it can thus be employed in embarked aircraft, planes and helicopters or in seaplanes.

It can also be used for the treatment of the windows of houses, buildings and tower blocks covered with a glass surface or of mirrors exposed or not exposed to the rain and to the weather. Under these conditions, the composition can be employed directly as cleaner and leaves a hydrophobic film at the surface to be treated. It can be packaged in a manual spray device, as is the case for cleaning products for windows in domestic dwellings and for the upkeep of buildings. This application makes it possible to decrease the frequency of the cleaning operations as the surfaces are less inclined to immobilize water and the deposition of dirt.

The composition can be used for the cleaning and the protection of optical glasses (spectacles) against dirt.

The example which follows illustrates the invention.

5 g of SF-1706 are introduced into a 200 ml Eclenmeyer flask and are dissolved with 95 g of isopropyl alcohol. The solution is ready for use.

Packaged in an aerosol container under nitrogen (200 ml container, 60 g of composition), the application of the product on a glass windshield is thereby simplified.

The effectiveness in the rain is immediate. Whatever the rain conditions, it is found that the efficiency of the windshield wipers is markedly increased and, depending upon the geometry of the vehicle, the use of said windshield wipers becomes optional from 60–70 km/hour.

The adhesion of frost in cold weather is reduced and likewise the effectiveness of the composition is noteworthy in freezing rain; the ice does not adhere to the windshield. It was noticed that the treated parts acquired less dust and that, in wet weather behind a vehicle, the visibility was increased.

What is claimed is:

1. A water-repellent composition consisting essentially of at least one hydrophobic active agent and 85–99%, by mass, isopropanol, wherein the hydrophobic active agent is a compound of an organopolysiloxane of formula (I):

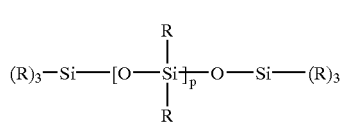

where p is an integer ranging from 0 to 150 and each R independently represents an alkyl or alkoxy group with 1 to 10 carbon atoms, a cycloalkyl group with 3 to 10 carbon atoms, a phenyl group, an aminated group, a halogen or a hydrogen, with the condition that at least one R is an aminated group.

2. A composition as claimed in claim 1, wherein it additionally consists essentially of at least one perfume essence in a proportion of 0.001 to 1% by mass of the composition.

3. A composition as claimed in claim 1, wherein the compound of formula (I) is an aminoethylaminopropylpolysiloxane having a clear color.

4. A composition as claimed in claim 2, wherein the perfume essence is d-limonene, Gallia green or pine, or lavender.

5. A composition as claimed in claim 1, wherein it additionally consists essentially of at least one stabilizer in a proportion of 0.1 to 5% with respect to the weight of the composition.

6. A water-repellent composition consisting essentially of 1–15%, by mass, of at least one hydrophobic active agent and 85–99%, by mass, of at least one solvent which is compatible with the at least one hydrophobic active agent, this solvent being other than a fluorinated hydrocarbon, wherein the solvent is an organic compound comprising at least one oxygen-comprising functional group and in that the hydrophobic active agent is a compound of an organopolysiloxane of formula (I):

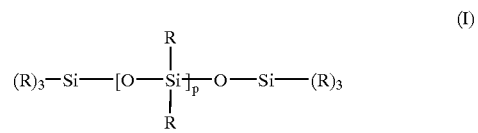

where p is an integer ranging from 0 to 150 and each R independently represents an alkyl or alkoxy group with 1 to 10 carbon atoms, a cycloalkyl group with 3 to 10 carbon atoms, a phenyl group, an aminated group, a halogen or a hydrogen, with the condition that at least one R is an aminated group.

7. A composition as claimed in claim 6, wherein the composition consists essentially of from 90 to 98%, by mass, of the solvent and from 2 to 10%, by mass, of the hydrophobic active agent.

8. A water-repellent composition consisting of at least one hydrophobic agent and at least one solvent which is compatible with the at least one hydrophobic active agent, this solvent being other than a fluorinated hydrocarbon, wherein the solvent is an organic compound comprising at least one oxygen-comprising functional group and in that the hydrophobic active agent is a compound of an organopolysiloxane of formula (I):

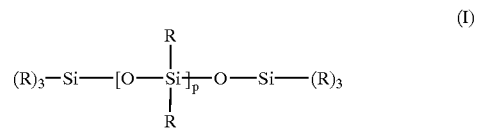

where p is an integer ranging from 0 to 150 and each R independently represents an alkyl or alkoxy group with 1 to 10 carbon atoms, a cycloalkyl group with 3 to 10 carbon atoms, a phenyl group, an aminated group, a halogen or a hydrogen, with the condition that at least one R is an aminated group.

9. A method of repelling water from a windshield of a motor vehicle comprising applying a composition made by combining at least one hydrophobic active agent and at least one solvent which is compatible with the at least one hydrophobic active agent, this solvent being other than a fluorinated hydrocarbon, wherein the solvent is an organic compound comprising at least one oxygen-comprising functional group and in that the hydrophobic active agent is a compound of an organopolysiloxane of formula (I):

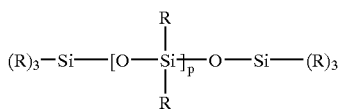

where p is an integer ranging from 0 to 150 and each R independently represents an alkyl or alkoxy group with 1 to 10 carbon atoms, a cycloalkyl group with 3 to 10 carbon atoms, a phenyl group, an aminated group, a halogen or a hydrogen, with the condition that at least one R is an aminated group.

10. A method of repelling water from a transparent surface, comprising applying a composition comprising at least one hydrophobic active agent and at least one solvent which is compatible with the at least one hydrophobic active agent, this solvent being other than a fluorinated hydrocarbon, wherein the solvent is an organic compound comprising at least one oxygen-comprising functional group and in that the hydrophobic active agent is a compound of an organopolysiloxane of formula (I):

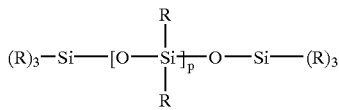

where p is an integer ranging from 0 to 150 and each R independently represents an alkyl or alkoxy group with 1 to 10 carbon atoms, a cycloalkyl group with 3 to 10 carbon atoms, a phenyl group, an aminated group, a halogen or a hydrogen, with the condition that at least one R is an aminated group.

11. A pressurized container comprising a water-repellent composition consisting essentially of at least one hydrophobic active agent and at least one solvent which is compatible with the at least one hydrophobic active agent, this solvent being other than a fluorinated hydrocarbon, wherein the solvent is an organic compound comprising at least one oxygen-comprising functional group and in that the hydrophobic active agent is a compound of an organopolysiloxane of formula (I):

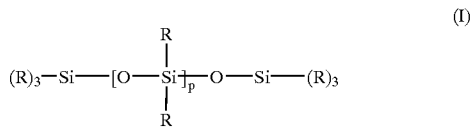

where p is an integer ranging from 0 to 150 and each R independently represents an alkyl or alkoxy group with 1 to 10 carbon atoms, a cycloalkyl group with 3 to 10 carbon atoms, a phenyl group, an aminated group, a halogen or a hydrogen, with the condition that at least one R is an aminated group, and a pressurized inert carrier gas.

12. A pressurized container as claimed in claim 11, wherein the organic compound comprises at least one oxygen-comprising functional group of an alcohol, a ketone, an ether, or an acetal functional group.

13. A pressurized container as claimed in claim 11, wherein the solvent is isopropanol.

14. A pressurized container as claimed in claim 11, wherein the composition consists essentially of, as percentage by mass, from 80 to 99% of the solvent and from 1 to 20% of the hydrophobic active agent.

15. The container as claimed in claim 11, wherein the inert gas is nitrogen.

16. A pressurized container according to claim 13, consisting essentially of 80 to 99%, by mass, isopropanol.

17. A pressurized container according to claim 13, consisting essentially of 85 to 99%, by mass, isopropanol.

* * * * *